Dec. 29, 1931.    J. GILTSCH    1,838,756
WINDSHIELD OPERATING DEVICE
Filed July 15, 1929
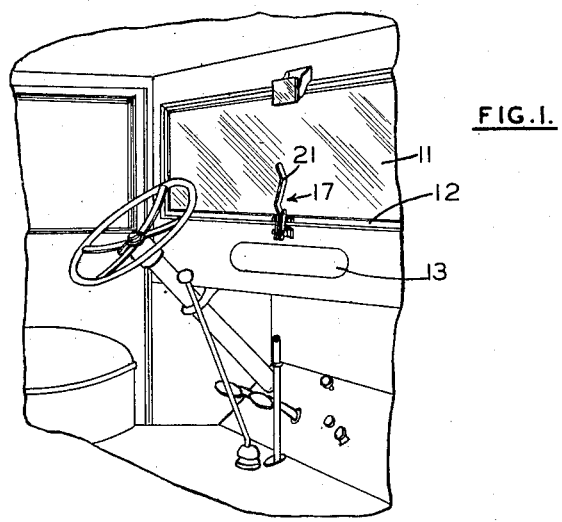
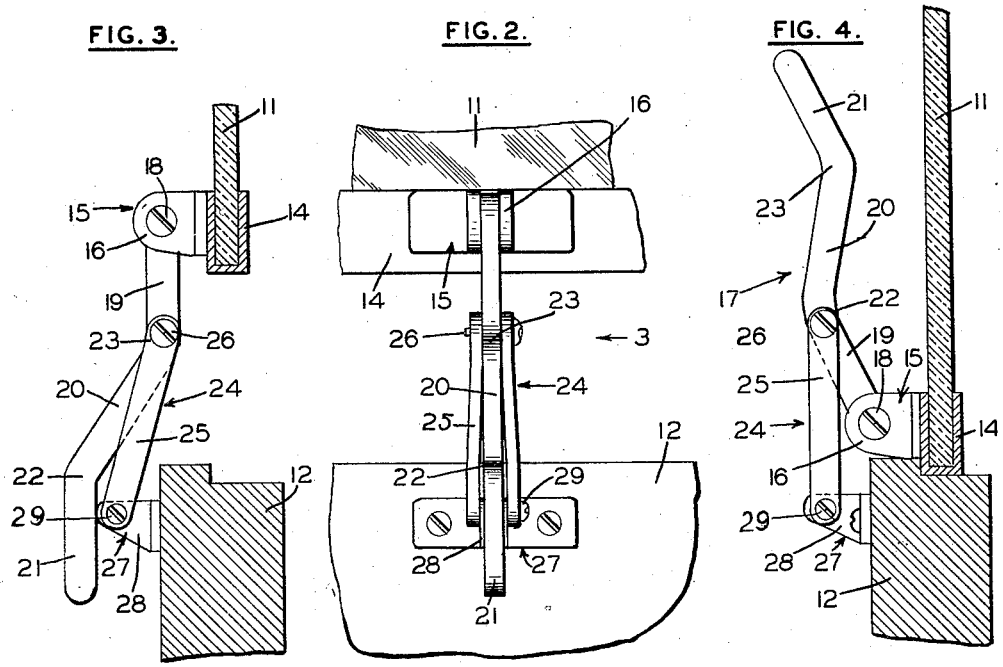
INVENTOR
JOHN GILTSCH
BY  Hazard and Miller
ATTORNEYS Patented Dec. 29, 1931

1,838,756

UNITED STATES PATENT OFFICE

JOHN GILTSCH, OF LOS ANGELES, CALIFORNIA, ASSIGNOR TO STANDARD CARRIAGE WORKS, INC., OF LOS ANGELES, CALIFORNIA, A CORPORATION OF CALIFORNIA

WINDSHIELD OPERATING DEVICE

Application filed July 15, 1929. Serial No. 378,481.

My invention is a windshield operating device suitable for motor vehicles.

An object of my invention is a simple device which may be connected above the instrument panel in a motor vehicle and attached to the windshield so that by a simple levering action the windshield may be raised or elevated, thus affording an opening for purposes of ventilation and in which the device remains either completely opened or closed and is not adapted to be retained in an intermediate position.

Another detailed object of my invention is having a lever which may be connected to the lower portion of the windshield which lever has a link pivotally connected thereto, the link being attached to the sill on which the windshield seats in the closed position, the lever being adapted to extend upwardly inside of the windshield and in the open position the lever extending downwardly on the inside of the sill and the link with part of the lever forms a type of toggle connection whereby the weight of the windshield maintains the toggle lever in its locked position, thus effectively holding the windshield in its extreme open position.

In constructing my invention I employ a U-shaped holder which engages the lower edge of the windshield and this holder has a bracket thereon to which is pivoted the lever. This lever has two obtuse bends in opposite directions and in one of these bends the link is pivotally connected, the lower end of the link being attached to a second bracket secured on the inside of the sill above the instrument panel. By this construction when the windshield is in its lowered or closed position, the link extends vertically and the lever also extends in a general vertical direction on the inside of the windshield. The lever may then be pulled downwardly until the lower end of the lever engages the second bracket and in this action the windshield is hoisted, using the upper end of the link as a fulcrum for the lever and as the link swings inwardly partly over the sill, it forms a toggle lock, the weight of the windshield preventing the opening of this lock and thus the windshield being held open.

My invention is illustrated in the accompanying drawings, in which:

Figure 1 is a perspective view of the driver's compartment of a vehicle with my invention fitted to the windshield and to the sill above the instrument panel;

Fig. 2 is an elevation with the windshield in its uppermost position;

Fig. 3 is a side elevation showing the sill and the windshield in section as if taken in the direction of the arrow 3 of Fig. 2;

Fig. 4 is an elevation similar to Fig. 3, with the windshield lowered and resting on the sill.

In the drawings, the windshield 11 rests on the sill 12, this sill being above the instrument panel 13. The lower edge of the windshield has a U-shaped holder 14. On the inside of this holder there is a bracket 15 which bracket is indicated as having a pair of ears 16 with the lever 17 connected to the bracket by the pivot pin 18. This lever has an inner section 19, a middle section 20 and an outer section 21 having an obtuse angle 22 in one direction between the sections 19 and 20 and an obtuse section 23 between the sections 20 and 21.

A link 24 which is formed of two straps 25 connected by a pivot pin 26 to the lever 17 at the obtuse angle 22, connects at its lower end to a bracket 27. This bracket has a single stub 28 through which the pivot pin 29 extends. The bracket 27 is secured to the sill by screws or the like.

When the windshield is closed, the lever and the link occupy the position shown in Figs. 1 and 4, the holder 14 resting on the sill and the link 24 holding the lever 17 in an upward position but spaced from the glass of the windshield. This spacing is sufficient so there is no danger in traveling over rough roads of the lever breaking the glass or even contacting therewith; thus a rattle is prevented. When it is desired to open a window, the operator grasps the outer end 21 and swings this in a downward direction until the lever is brought into the position shown in Figs. 2 and 3, in which action the pivot pin 26 on the upper end of the link acts as a fulcrum. This pivot pin then moves inwardly slightly over the sill as shown in Fig. 3, so that it is forward of a direct line joining the pivot pins 18 and 29 connected to the windshield and the sill respectively.

The lower end 21 of the lever bears against the lug 28 of the lower bracket 27. This forms a type of toggle lock so that the weight of the windshield holds the device in a locked position; the opening between the lower edge of the windshield and the sill providing the space for ventilation. On account of this toggle type of lock the jolting of the vehicle or the vibration thereof, does not tend to break or unlock the lock, so that there is no danger of the windshield slamming down when not intended. To lower the windshield the operator gives the lever 17 a reverse motion to that described, swinging it from the position shown in Figs. 2 and 3 to that shown in the position of Figs. 1 and 4. With this construction of device the windshield cannot be readily held in an intermediate position, but must either be in the completely closed or completely open position.

Various changes may be made in the principles of my invention without departing from the spirit thereof as set forth in the description, drawings and claims.

I claim:

1. A windshield operating device comprising a structure having a sill with a slidably mounted windshield resting thereon, a holder on the lower edge of the windshield having a bracket, a lever pivotally connected to the bracket, a second bracket attached to the sill, a link pivotally connected to the second bracket, a pivotal connection between the lever and the link, whereby on an arcuate movement of the lever the windshield is slid to a position above the sill, the lever having a bend therein, whereby when the windshield is in the fully opened position a toggle lock is effected between the lever and the link whereby the pivotal connection of the lever and the link is on the side of the sill on a line joining the pivotal connection of the lever to the first bracket and the pivotal connection of the link to the second bracket.

2. The combination of a window frame having a sill and opposite sides with a windshield slidable therein, a lever having a pivotal connection to a lower part of the windshield, a link pivotally connected to the lever, a bracket pivotally connected to the link and attached to the sill between the two sides, the lever in its oscillation being adapted to raise and lower the windshield, the lever having a bend therein adapted when in its lowered position to form a locking toggle with the said link and maintain the windshield elevated.

3. The combination of a window frame having a sill and two sides with a windshield slidably mounted therein and adapted to rest on the said sill, a first bracket secured to a lower part of the windshield, a second bracket secured to the sill between the two sides, a lever pivotally connected to the first bracket, a link pivotally connected to the lever and to the second bracket, the said lever having a bend adjacent the pivotal connection to the link, the said lever occupying an upper position when the windshield rests on the sill, and the said lever when in a lowered position forming a locking toggle with the said link maintaining the windshield elevated.

In testimony whereof I have signed my name to this specification.

JOHN GILTSCH.